United States Patent
Beamish

(10) Patent No.: US 8,676,149 B2
(45) Date of Patent: Mar. 18, 2014

(54) PROLONGING INTERNAL POWER SUPPLY LIFE IN A MOBILE COMMUNICATION DEVICE

(75) Inventor: Norman Beamish, Cork (IE)

(73) Assignee: Freescale Semiconductor, Inc., Austin, TX (US)

( * ) Notice: Subject to any disclaimer, the term of this patent is extended or adjusted under 35 U.S.C. 154(b) by 633 days.

(21) Appl. No.: 12/682,469

(22) PCT Filed: Oct. 18, 2007

(86) PCT No.: PCT/IB2007/054247
§ 371 (c)(1),
(2), (4) Date: Apr. 9, 2010

(87) PCT Pub. No.: WO2009/050538
PCT Pub. Date: Apr. 23, 2009

(65) Prior Publication Data
US 2010/0234060 A1    Sep. 16, 2010

(51) Int. Cl.
*H04B 1/16* (2006.01)
*H04B 1/38* (2006.01)

(52) U.S. Cl.
USPC ............. 455/343.1; 455/343.3; 455/343.2; 455/574

(58) Field of Classification Search
USPC .................. 455/522, 69, 127.12
See application file for complete search history.

(56) References Cited

U.S. PATENT DOCUMENTS

| | | | |
|---|---|---|---|
| 6,724,828 B1 | 4/2004 | Dabak | |
| 7,010,339 B2 * | 3/2006 | Mullen et al. | 600/430 |
| 7,035,676 B2 | 4/2006 | Ranta | |
| 7,072,628 B2 | 7/2006 | Agashe et al. | |
| 7,343,180 B2 * | 3/2008 | Kazakevich et al. | 455/574 |
| 7,386,328 B2 * | 6/2008 | Umewaka et al. | 455/574 |
| 2004/0106441 A1 * | 6/2004 | Kazakevich et al. | 455/574 |
| 2004/0253955 A1 * | 12/2004 | Love et al. | 455/442 |
| 2005/0070341 A1 * | 3/2005 | Umewaka et al. | 455/574 |
| 2006/0141968 A1 | 6/2006 | Masaki | |

FOREIGN PATENT DOCUMENTS

| | | |
|---|---|---|
| GB | 2316514 A | 2/1998 |
| WO | 01/05088 A | 1/2001 |

OTHER PUBLICATIONS

International Search Report and Written Opinion correlating to PCT/IB2007/054247 dated Aug. 13, 2008.

* cited by examiner

*Primary Examiner* — Tilahun B Gesesse

(57) ABSTRACT

A method of communicating between a mobile communication device including a power supply, and a base station. The mobile device has first and second alternative communication modes, the first communication mode having higher quality of service and higher power consumption than the second communication mode. The second communication mode is adopted in response to a characteristic of the mobile device power supply indicative of a reduced reserve of power in the power supply, and a state indication is transmitted from the mobile device to the base station. The base station can respond to the state indication from the mobile device by modifying a communication characteristic of the base station with the mobile device, whereby to tend to compensate for the mobile device switching between the first and second communication modes.

30 Claims, 5 Drawing Sheets

PROLONGING INTERNAL POWER SUPPLY LIFE IN A MOBILE COMMUNICATION DEVICE

FIELD OF THE INVENTION

This invention relates to prolonging internal power supply life in a mobile communication device. The invention is especially, but not exclusively, applicable to reducing mobile device power consumption in a cellular network.

BACKGROUND OF THE INVENTION

Mobile communication devices, such as portable telephones in a cellular network or two-way radio devices include an internal power supply, usually a rechargeable battery. Reducing power consumption of such devices is a constant preoccupation in order to maximise the life of the power supply. However, there is often a trade-off between quality of service, especially quality of communication, and power consumption, leading to compromises both in design features and operating parameters.

In cellular communication networks and other radio communication systems, the communication channel from the transmitter to the receiver is subject to noise and interference from multipath transmissions caused by scattering and transmission of the same data by more than one transmitter. One way of reducing the effect of noise and interference is spatial diversity, in which the receiver and/or the transmitter have a plurality of antennas and the received signals are received in separate receiver chains and combined so as to reinforce the wanted signal and/or transmitted signals containing the same data are processed in separate transmit chains. The use of separate receiver or transmitter chains increases power consumption but provides improved quality of service.

U.S. Pat. Nos. 7,072,628 and 6,724,828 disclose cellular communication networks using spatial diversity, in which the use of receive diversity in a mobile device can be disabled in response to parameters indicative of good quality communication conditions for the relevant communication channel, so as to reduce power consumption when spatial diversity gives reduced benefits in terms of quality of communication.

Quality of service of a mobile device deteriorates rapidly when the internal power supply is nearly exhausted, especially if it supplies power at a reduced voltage and/or current, for example. An object of the present invention is to improve the compromise between quality of service, and power consumption in these conditions.

SUMMARY OF THE INVENTION

The present invention provides a method of communication, a mobile device and a base station as described in the accompanying claims.

DETAILED DESCRIPTION OF THE PREFERRED EMBODIMENTS

Embodiments of the present invention may operate in accordance with various communication standards. Examples of such standards, including code division multiple access ('CDMA'), are the UMTS standard of the International Telecommunication Union (ITU), the $3^{rd}$ generation partnership project ('3GPP') under the auspices of the European Telecommunications Standards Institute (ETSI), the CDMA2000 standard of the Telecommunications Industry Association of USA and the WCDMA air-interface specification.

Figure 1:
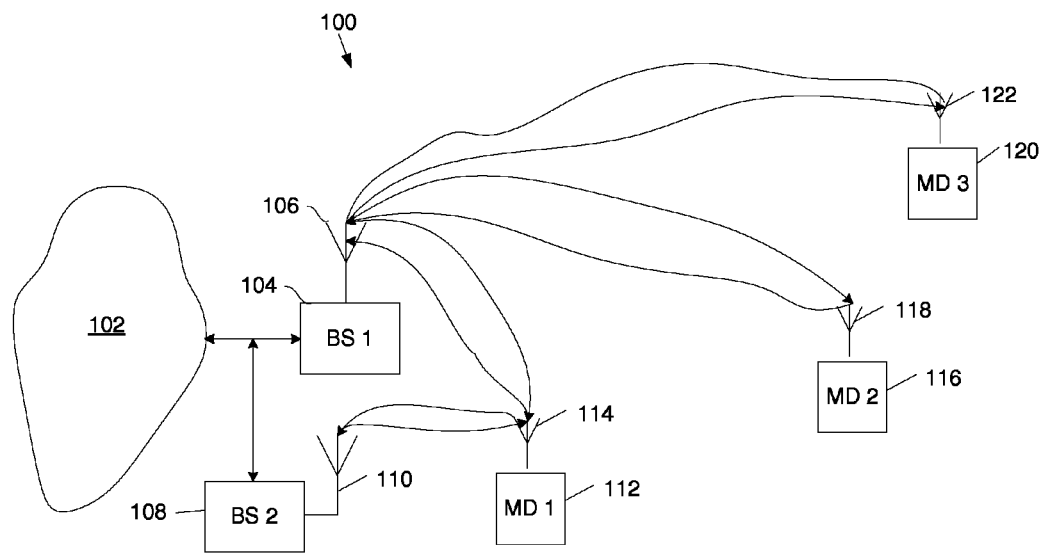
FIG. 1 is a schematic diagram of a cellular telephone system which may operate by a method of communication in accordance with one embodiment of the invention, given by way of example.

FIG. 1 shows a general diagram of a cellular telephone network 100 to which embodiments of the present invention may be applied. The network includes a public switched telephone land line network 102, to which are connected a first base station 104 having a transmit/receive antenna array 106 and a second base station 108 having a transmit/receive antenna array 110. Although two base stations are shown, it will be appreciated that in practice more will be provided, whose coverage define respective cell areas within the geographic extent of the network 100. Mobile devices, such as handsets, 112, 116 and 120 provided with respective antenna arrays 114, 118 and 122 can move within the network, communicating with the base stations. The communication will typically be multipath, involving multiple reflections and/or partial shading. At a given moment, a given mobile device may communicate with a single base station, as is shown for mobile devices 116 and 120 with base station 104, or simultaneously with more than one base station, as is shown for mobile device 112 with base stations 104 and 108. In the latter case, the base stations 104 and 108 may transmit identical data to the mobile device 112 and may receive identical data from the mobile device 112. Data is transmitted between the base stations and the mobile devices both in content channels and in control channels, sometimes known as pilot channels, which may transmit information about channel identification, propagation conditions, timing, modulation and encoding information and the like.

Figure 2:
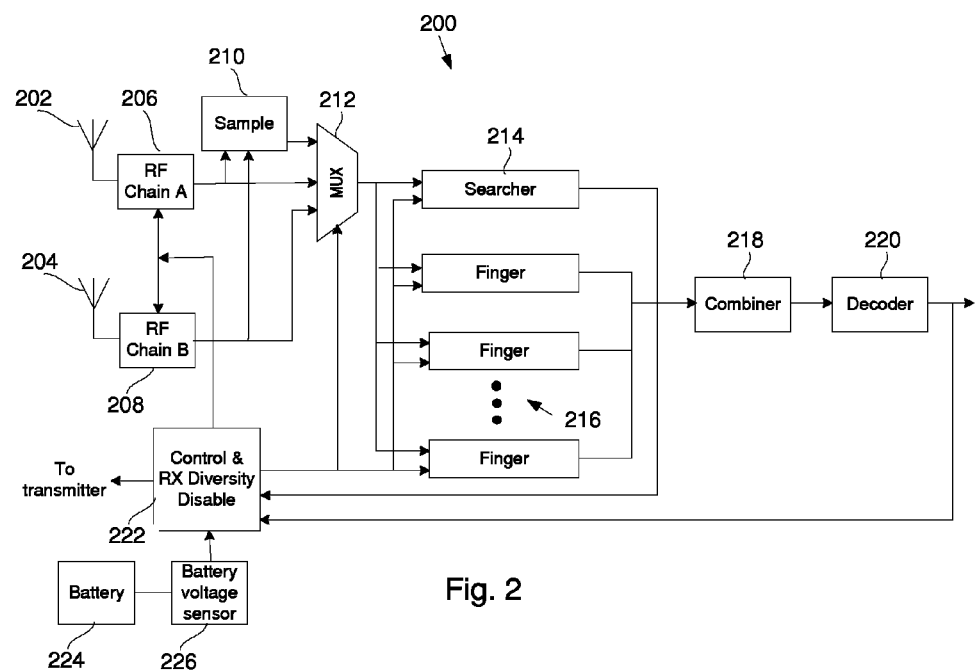
FIG. 2 is a block schematic diagram of a receiver module for a mobile device in the system of FIG. 1 in accordance with an embodiment of the invention, given by way of example.

FIG. 2 is a diagram of a receiver module 200 in accordance with an embodiment of the invention for use in a mobile device in a network of the kind illustrated in FIG. 1 for processing and demodulating the signal received.

The receiver module 200 for a mobile device, such as 112, 116 or 120 of FIG. 1, includes two antenna elements 202 and 204 and respective RF receiver chains 206 and 208. It will be appreciated that more than two antenna elements and RF chains may be provided. Samples of baseband signals received by the RF chains 206 and 208 are supplied to a sample store 210, which holds the samples temporarily. The samples, together with the outputs of the RF chains 206 and 208 are supplied to a multiplexer 212. The output of the multiplexer 212 is supplied to a searcher 214 and to a plurality of demodulation and de-spreading finger elements 216, whose outputs are combined by a combiner 218 and supplied to a decoder 220, such as a turbo decoder. The output of the searcher 214 is supplied to a control unit 222, which controls operation of the RF chains 206 and 208, the multiplexer 212, the searcher 214 and the finger elements 216, the control unit also responding to the output of the decoder 220. The searcher 214 responds to received pilot signals which identify communication channels and timing and the demodulation and de-spreading is performed using the complex conjugate of the PN sequence and assigned Walsh function, for example.

Such a receiver 200 normally functions to improve the quality of reception by exploiting the spatial diversity offered by the different antenna elements 202 and 204 and associated RF receiver chains 206 and 208, under the control of the control unit 222 and various suitable techniques for exploiting the spatial diversity are available. However, the receiver module 200 of this embodiment of the invention for use in a mobile device with a battery (or other internal power supply) 224 also includes a battery voltage sensor 226. The battery 224 supplies power to the whole of the receiver 200 for the mobile device, including the RF chains 206, 208, and a reduced power consumption of the RF chains 206, 208 slows the depletion of the energy reserve of the battery 224. The control unit 222 is responsive to a value of the battery voltage less than a threshold at which loss of reception is becoming imminent to adopt a mode of communication having smaller power consumption than the normal mode and accept a correspondingly reduced quality of service of the receiver, in particular a reduced quality of communication. It will be appreciated that reducing power consumption during the period when battery voltage is low postpones total loss of the communication link and gives the user more time to communicate until he is able to recharge the power supply. Generally speaking, reduction of the quality of service is undesirable, but nonetheless it is preferable in these circumstances to rapid total loss of communication.

More specifically, in the embodiment of the invention shown in FIG. 2, when a low battery condition is detected, the control unit 222 acts to disable one or more of the RF chains such as 206, 208, keeping one RF chain operational at minimum. This disables partially or totally support in the receiver for spatial diversity reception. In this embodiment of the invention, the control unit 222 also causes the transmitter of the mobile device to send over the uplink to the base stations a state indication indicative of the change of communication mode adopted by the mobile device.

Figure 3:
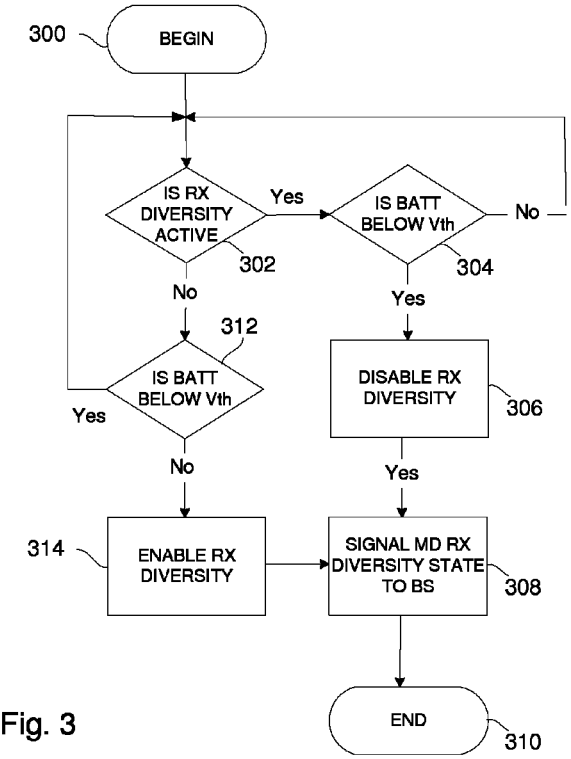
FIG. 3 is a flow chart of operation of the receiver module of FIG. 2 in a mobile device by a method of communication in accordance with an embodiment of the invention, given by way of example.

An example of a method of operation of the embodiment of the invention shown in FIG. 2 is illustrated in FIG. 3. In this embodiment of the invention, the mobile device has two alternative modes of communication, a first one of which has a higher quality of service and higher power consumption than the other. Normally the first mode of communication is utilised. However, the other communication mode offering a reduction in power consumption is selected by the control unit in response to sensing of a low battery condition. In this embodiment of the invention, the reduction of power consumption is obtained by a reduction of support for receive spatial diversity.

More specifically, FIG. 3 is a flow-chart of the method, which begins at 300. A decision is taken at 302 whether the mobile device receiver is operating with full receive diversity support, with both the RF chains 206 and 208 activated. If so, a check is made at 304, whether the battery sensor 226 indicates a low battery condition, by sensing whether the battery voltage is lower than the threshold Vth. If the battery is not low, the receiver is left with full receive diversity support and the control loop returns to the beginning. If the battery 224 is low, the control unit 222 disables receive diversity support at 306 partially or, where there are only two RF chains 206 and 208, totally by disabling one of the chains and economising its power consumption by switching off that RF chain's power supply. A state indication indicative of reduced receive diversity support is produced by the control unit 222 at 308, and the mobile device transmits this state indication to the base station, terminating the control cycle at 310.

If the decision taken at 302 is that the mobile device receiver is not operating with full receive diversity support and only one of the RF chains 206 and 208 is enabled, a check is made at 312 whether the battery sensor 226 indicates a low battery condition, by sensing whether the battery voltage is lower than the threshold Vth. If the battery 224 is low, the receiver is left without full receive diversity support and the control loop returns to the beginning. If the battery 224 is not low, the control unit 222 activates receive diversity support again at 314 by switching back on the disabled RF chain's power supply and accepting the increased power consumption. The state indication indicative of reduced receive diversity support is de-asserted by the control unit 222, and the mobile device transmits the corresponding state indication to the base station at 308, terminating the control loop at 310.

In another embodiment of the invention, other characteristics of the internal power supply indicative of a reduced reserve of energy are sensed, such as battery current, for example.

Figure 4:
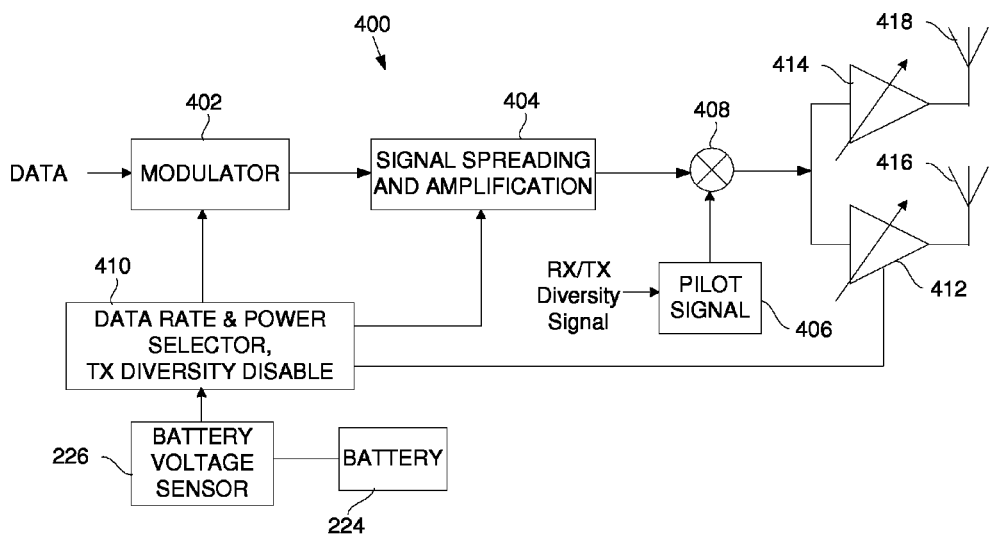
FIG. 4 is a block schematic diagram of a transmitter module for a mobile device in the system of FIG. 1 in accordance with an embodiment of the invention, given by way of example.

FIG. 4 shows a transmitter module 400 in accordance with an embodiment of the invention for use in a mobile device in a network of the kind illustrated in FIG. 1 for processing and modulating the signal to be transmitted with capability for transmit diversity. It will be appreciated that a mobile device having receive diversity capability does not necessarily have transmit diversity capability also, although this may be desirable.

The transmitter shown in FIG. 4 comprises a modulator 402, which receives data whose content is to be transmitted. A spreader and amplifier 404 processes the modulated signal. A pilot signal is generated by a generator 406 and added to the spread and amplified signal in an adder 408. A transmit controller 410 selects the data transmission rate and the transmit power by controlling the modulator 402 and processor 404. The combined signal from the adder 408 is transmitted by a plurality of RF chains, in this example two chains 412 and 414, which comprise respective RF power amplifiers and may also comprise delay elements (not shown) and feed respective antenna elements 416 and 418, which may also be used for reception. In this embodiment of a transmitter with controllable transmit diversity in a mobile device, the transmit controller 410 also controls the activation and deactivation of transmit spatial diversity. In the case of a mobile communication device with receive diversity control as in FIGS. 2 and 3 for example, whether with transmit diversity control as in FIG. 4 or without, the generator 406 may include in the transmissions to the base station diversity state indications of the activation and deactivation of receive spatial diversity and/or of transmit spatial diversity. The battery 224 supplies power to the whole of the transmitter 400 for the mobile device, including the RF chains 412, 414, so that a reduced power consumption of the RF chains 412, 414 slows the depletion of the energy reserve of the battery 224.

In the embodiment of the invention shown in FIG. 4, another communication mode offering a reduction in power consumption for a mobile communication device is reduced transmit spatial diversity selected by the transmit controller 410 in response to sensing of a low battery condition instead of, or as well as, reduction of receive spatial diversity support. In this way, a cell phone or other mobile communication device offers spatial diversity in the receiver and/or transmitter but also permits a graceful degradation of performance in response to low battery conditions. Although FIG. 4 shows a transmitter where reduction of power consumption is obtained by a reduction of transmit spatial diversity, in other embodiments of mobile devices in accordance with the present invention, other alternative modes of communication are used offering a reduction of power consumption in low battery conditions.

Figure 5:
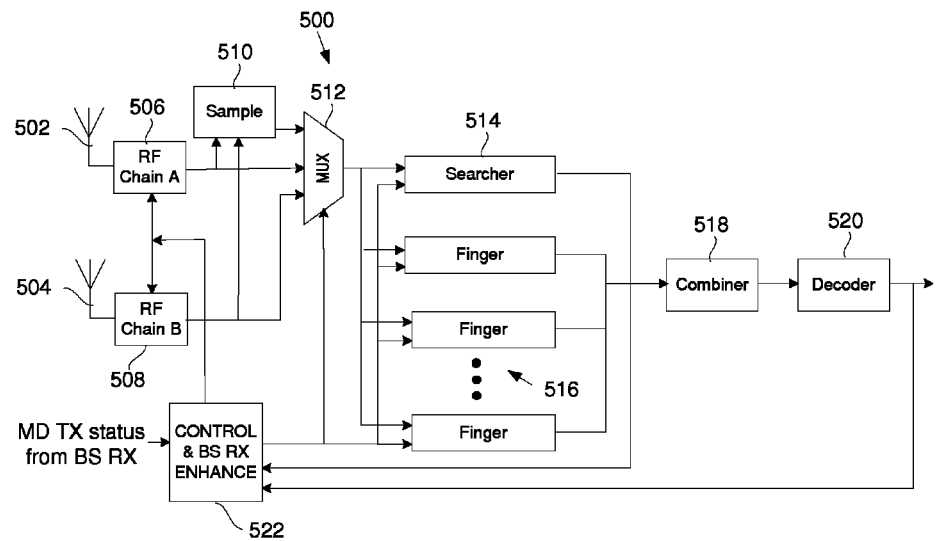
FIG. 5 is a block schematic diagram of a receiver module for a base station in the system of FIG. 1 in accordance with an embodiment of the invention, given by way of example.

FIG. 5 is a diagram of a receiver module 500 in accordance with an embodiment of the invention for use in a base station in a network of the kind illustrated in FIG. 1 for processing and demodulating the signal received.

The receiver module 500 for a base station, such as 104 or 108 of FIG. 1, includes two antenna elements 502 and 504 and respective RF receiver chains 506 and 508. It will be appreciated that more than two antenna elements and RF chains may be provided. Samples of baseband signals received by the RF chains 506 and 508 are supplied to a sample store 510, which holds the samples temporarily. The samples, together with the outputs of the RF chains 506 and 508 are supplied to a multiplexer 512. The output of the multiplexer 512 is supplied to a searcher 514 and to a plurality of demodulation and de-spreading finger elements 516, whose outputs are combined by a combiner 518 and supplied to a decoder 520, such as a turbo decoder. The output of the searcher 514 is supplied to a control unit 522, which controls operation of the RF chains 506 and 508, the multiplexer 512, the searcher 514 and the finger elements 516, the control unit also responding to the output of the decoder 520. The searcher 514 responds to received pilot signals which identify communication channels and timing and the demodulation and de-spreading is performed using the complex conjugate of the PN sequence and assigned Walsh function, for example.

The receiver 500 normally treats the channels used by different mobile devices according to similar criteria, which may vary according to the distance of the mobile device from the receiver 500, for example. However, the receiver 500 also has the possibility to devote additional resources to enhance reception of a signal from a particular mobile device, under the control of the control unit 522. More particularly, the control unit 522 is responsive to a state indication transmitted by the mobile device to the base station. In this embodiment of the invention, the state indication is an indication of the transmit mode status of the mobile device. In another embodiment of the invention, the state indication is representative of a low battery condition of the mobile device.

Figure 6:
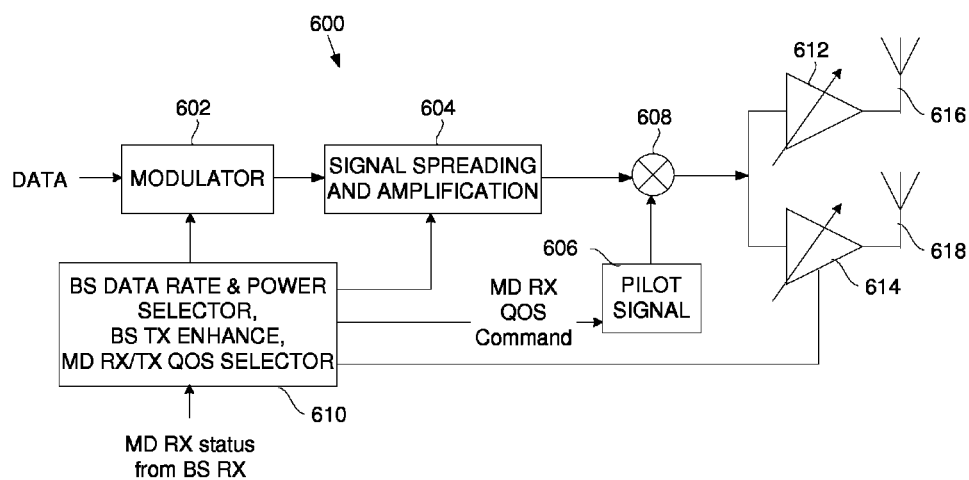
FIG. 6 is a block schematic diagram of a transmitter module for a base station in the system of FIG. 1 in accordance with an embodiment of the invention, given by way of example.

FIG. 6 shows a transmitter module 600 in accordance with an embodiment of the invention for use in a base station in a network of the kind illustrated in FIG. 1 for processing and modulating the signal to be transmitted with capability for transmit diversity. It will be appreciated that a base station having receive diversity capability does not necessarily have transmit diversity capability also, although this may be desirable.

The transmitter shown in FIG. 6 comprises a modulator 602, which receives data whose content is to be transmitted. A spreader and amplifier 604 processes the modulated signal. A pilot signal is generated by a generator 606 and added to the spread and amplified signal in an adder 608. A transmit controller 610 selects the data transmission rate and the transmit power by controlling the modulator 602 and processor 604. The combined signal from the adder 608 is transmitted by a plurality of RF chains, of which two chains 612 and 614 are shown in FIG. 6 although more may be provided, and which comprise respective RF power amplifiers and may also comprise delay elements (not shown), the chains 612 and 614 feeding respective antenna elements 616 and 618, which may also be used for reception.

The transmitter 600 in the base station normally treats the channels used by different mobile devices according to similar criteria, which may vary according to the distance of the mobile device from the transmitter 600, for example. However, the transmitter 600 also has the possibility to devote additional resources to enhance transmission of a signal to a particular mobile device, under the control of the controller 610, in particular as a function of state indications sent by the mobile device and received by the base station receiver. In this embodiment of the invention, the controller responds to an indication that the mobile device is operating with reduced receive diversity, to increase transmit power from the base station for the channel of that mobile device for example. Alternatively, or additionally, the controller 610 may respond to a state indication transmitted by the mobile device and representative of a low battery condition of the mobile device.

The controller 610 may also select intended operating modes for the mobile device transmitter and receiver, in particular reduced power consumption operating modes for the mobile device, with reduced quality of service and send to the generator 606 corresponding command signals for inclusion in the pilot signals transmitted to the mobile device, such as commands for the activation and deactivation of receive spatial diversity and/or of transmit spatial diversity at the mobile device.

Figure 7:
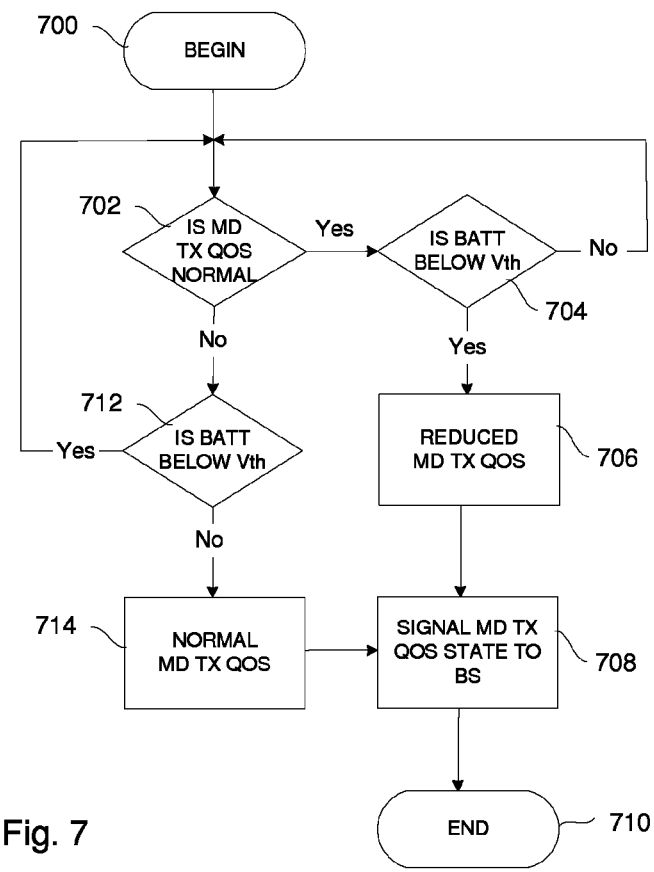
FIG. 7 is a flow chart of operation of the transmitter module of FIG. 4 in a mobile device by a method of communication in accordance with another embodiment of the invention, given by way of example.

An example of a method of operation of the mobile device transmitter embodiment of the invention shown in FIG. 4 is illustrated in FIG. 7. In this method of communication, the mobile device has two alternative modes of communication, a first one of which has a higher quality of service and higher power consumption than the other. Normally the first mode of communication is utilised. However, the other communication mode offering a reduction in power consumption is selected by the control unit in response to sensing of a low battery condition. In this embodiment of the invention, the reduction of power consumption is obtained by disabling transmit spatial diversity. The reduction of power consumption of the mobile device by adopting a reduced quality of transmission service may be additional to, or alternative to, adopting a reduced quality of reception service, such as shown in FIG. 4.

More specifically, FIG. 7 is a flow-chart of the method, which begins at 700. A check is made at 702 whether the controller 410 is selecting normal transmit quality of service, in this case full transmit diversity, by activating both the RF chains 412 and 414. If so, a check is made at 704 whether the battery sensor 226 indicates a low battery condition, by sensing whether the battery voltage is lower than the threshold Vth. If the battery is not low, the transmitter is left with full transmit quality of service and the control loop returns to the beginning. If the battery 224 is low, the controller 410 reduces transmit quality of service at 706, in this case by disabling transmit diversity support partially or, where there are only two RF chains 412 and 414, totally by disabling one of the chains and economising its power consumption by switching off that RF chain's power supply. A state indication indicative of reduced transmit quality of service is produced by the controller 410 at 708, and the mobile device transmits this state indication to the base station, terminating the control loop at 710.

If the decision taken at 702 is that the controller 410 is not selecting full transmit quality of service, in this case is disabling one of the RF chains 412 and 414 and accepting reduced transmit diversity, a check is made at 712 whether the battery sensor 226 indicates a low battery condition, by sensing whether the battery voltage is lower than the threshold Vth. If the battery 224 is low, the transmitter is left without full transmit quality of service and the control loop returns to the beginning. If the battery 224 is not low, the controller 410 activates normal transmit quality of service again at 714 by switching back on the disabled RF chain's power supply and accepting the increased power consumption. The state indication indicative of reduced transmit quality of service is de-asserted by the controller 410, and the mobile device transmits the corresponding state indication to the base station at 708, terminating the control loop at 710.

Transmission from the mobile station to the base station of a state indication enables the base station to react. If the decision to change the mobile device's communication mode is taken unilaterally in the mobile device, transmission of a state indication signalling the changed communication mode, or even simply signalling the low battery condition, enables the base station to change its own communication parameters and tend to compensate for reduced quality of service at the mobile device. For example, if the mobile device signals a disablement of receive diversity, the base station may increase its transmit power to tend to compensate. If the mobile device signals a disablement of transmit diversity, the base station may increase its receiver gain to tend to compensate or allocate more receive resources such as receive diversity paths or digital signal processor MIPS to that mobile device.

Figure 8:
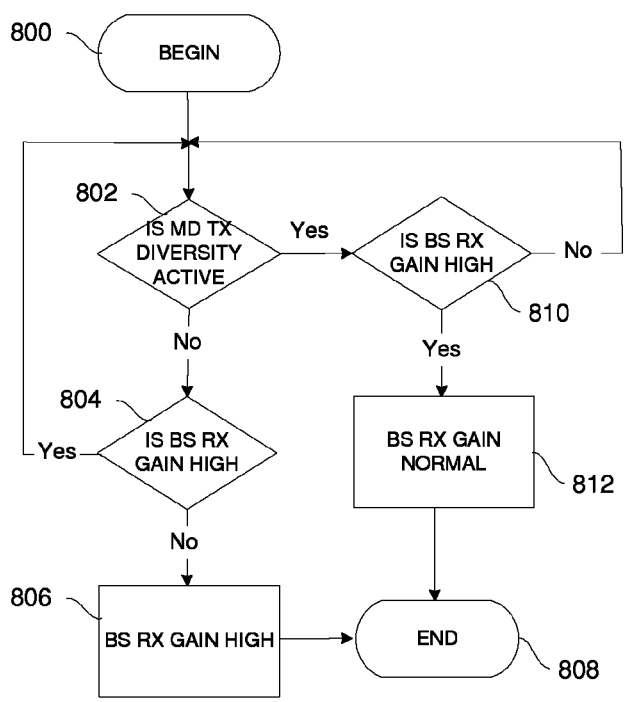
FIG. 8 is a flow chart of operation of the receiver module of FIG. 5 in a base station by a method of communication in accordance with yet another embodiment of the invention, given by way of example, the base station responding to operation of the transmitter module in a mobile device in accordance with FIG. 7

An example of the base station's reaction to a unilateral change of the mobile device's transmit mode is illustrated in FIG. 8, in which the control loop of the base station receive controller begins at 800. In this case, a state indication of the reduced power transmit mode at the mobile device is transmitted over the uplink to the base station without any direct indication of the mobile device's low battery condition. A check is made at 802 whether the state indication from the mobile device corresponds to reduced power transmit mode. If so, a decision is taken at 804 whether the base station control unit 522 is selecting enhanced uplink path gain, with increased diversity and receive amplifier gain devoted to that mobile device, for example. If that is the case, the base station is left with high uplink path gain and the control loop returns to the beginning. If normal uplink path gain is currently selected, the base station switches to high uplink path gain at 806 and the control loop ends at 808.

If the result of the check at 802 was that the state indication from the mobile device corresponds to normal power transmit mode, for example with full diversity, a decision is taken at 810 whether the base station controller 522 is selecting high uplink path gain. If normal uplink path gain is selected, the base station is left with unchanged uplink path gain and the control loop returns to the beginning. If high uplink path gain is currently selected, the base station switches to normal uplink path gain at 812 and the control loop ends at 808.

Figure 9:
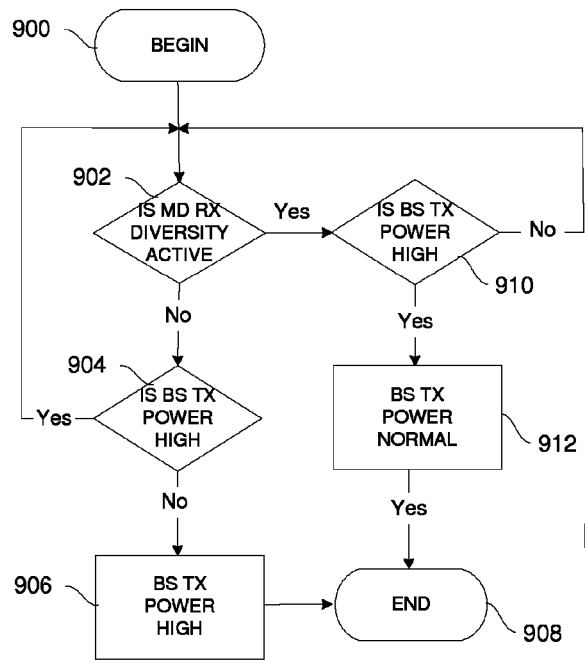
FIG. 9 is a flow chart of operation of the transmitter module of FIG. 6 in a base station by a method of communication in accordance with yet another embodiment of the invention, given by way of example, the base station responding to operation of the receiver module in a mobile device in accordance with FIG. 3.

An example of the base station's reaction to a unilateral change of the mobile device's receive mode is illustrated in FIG. 9, in which the control loop of the base station transmit controller begins at 900. In this case, a state indication of the receive diversity mode at the mobile device is transmitted over the uplink to the base station without any direct indication of the mobile device's low battery condition. This state indication may be in the form of a signal asserted when the mobile device receive diversity is de-activated and de-asserted when the mobile device receive diversity is activated. A decision is made at 902 whether the state indication corresponds to full receive diversity at the mobile device. If not, a check is made at 904 whether the base station controller 610 is applying enhanced transmit power to the signals for that mobile device. If not, the base station transmit power for that channel is increased at 906 and the control loop ends at 908. If the base station controller is applying transmit power at 904, the base station transmitter is left with increased transmit power and the control loop returns to the beginning.

If the check at 902 corresponds to reduced receive diversity at the mobile device, a check is made at 910 whether the base station controller is applying enhanced transmit power to the signals for that mobile device. If it is, the base station transmit power for that channel is reduced back to normal at 912 and the control loop ends at 908. If the base station controller is already applying normal transmit power at 910, the base station transmitter is left with normal transmit power and the control loop returns to the beginning.

The state indication transmitted by the mobile device may, at least initially, be an indication that the energy reserve of the battery 224 is low, as sensed by the battery voltage being lower than a fixed or programmable threshold, for example. In this case, in other embodiments of the present invention, instead of the mobile device changing communication mode unilaterally, the base station reacts by sending to the mobile device an instruction to change to a reduced power consumption mode selected by the base station. This enables the base station to to coordinate more complex changes to to the communication modes, including its own communication mode. Examples of such complex changes are adopting at both ends a more power efficient modulation scheme, such as Gaussian Minimum Shift Keying (GMSK) instead of Enhanced Data Rates for GSM Evolution (EDGE), or higher performance transport protocols such as High-Speed Uplink Packet Access and High-Speed Downlink Packet Access which can reduce the amplifier linearity requirements at the mobile device and allow reduced current drain. In addition, the change of communication mode at the mobile device may be confirmed back subsequently to the base station, which is desirable in some circumstances to avoid incompatibility, for example if the instruction to the mobile station is lost.

Figure 10:
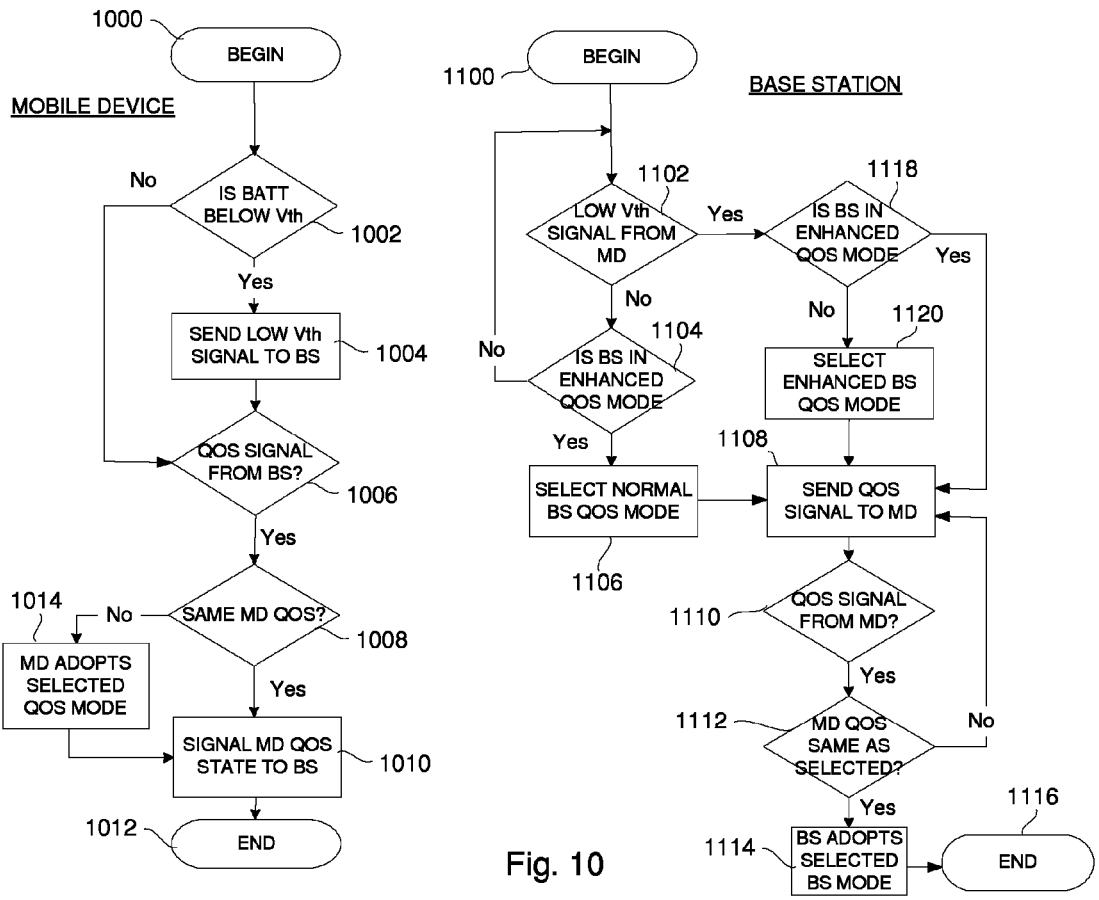
FIG. 10 is a flow chart of operation of a mobile device and a base station by a method of communication in accordance with yet another embodiment of the invention, given by way of example, the mobile device and base station including receiver modules as in FIGS. 2 and 5 and transmitter modules as in FIGS. 4 and 6.

FIG. 10 illustrates an embodiment of the present invention that functions in this manner. The operation begins in the mobile device at 1000 and a decision is made at 1002 whether the mobile device battery voltage is below a threshold indicating low energy reserve. If the battery indication is low, at 1004 the mobile device transmits over the uplink to the base station a low battery state indication and waits for a command from the base station, checking the reception of the command at 1006. If the battery state indication was not low at 1002, the operation passes directly to the check at 1006.

When a command to adopt a selected QOS and power consumption mode is received at 1006, the mobile device makes a check at 1008 whether its current operating mode corresponds to the command from the base station. If it does, at 1010 the mobile device sends to the base station a state indication of its current operating mode and the cycle ends at 1012. If the mobile device operating mode does not correspond to the base station command at 1008, the mobile device adopts the power consumption mode corresponding to the base station command at 1014 and at 1010 sends to the base station a state indication of its new operating mode and the cycle ends at 1012. Normally, if the battery state indication was low at 1002, the base station command at 1014 will correspond to a reduced power consumption mode. The state indication sent to the base station may be a signal that is de-asserted when the mobile device is operating in normal mode. The reduced power consumption mode may be a reduced quality of communication by reduced receive diversity and/or reduced transmit diversity. In other embodiments of the invention, the reduced power consumption mode involves a more power efficient modulation scheme or higher performance transport protocols, as described above.

The operation of the base station in this embodiment of the invention begins at 1100. A check is made at 1102 whether a state indication indicating a low battery condition is received from the mobile device. If not, the base station checks at 1104 whether it is operating in enhanced quality of service mode for that mobile device's channel, by devoting additional receive and/or transmit resources to that channel, for example. If not, the control loop returns to the beginning. If the base station is operating in enhanced mode at 1104, it selects normal communication mode for that channel at 1106, sends a corresponding indication to the mobile device at 1108, instructing the mobile device to adopt normal communication mode, and waits to receive a response from the mobile device at 1110 indicating the mobile device's current operating mode. The base station then checks at 1112 whether the mobile device operating mode state indication corresponds to the selected mode and if so the base station adopts the selected mode at 1114 and the control loop ends at 1116. If the mobile device operating mode state indication does not correspond to the selected mode, the base station reverts to stage 1108 and re-transmits the indication of the selected mode to the mobile device.

If at stage 1102 the state indication from the mobile device indicates a low battery condition, the base station checks at 1118 whether it is operating in enhanced quality of service mode for that mobile device's channel. If it is, the control loop passes directly to stage 1108. If it is not, the base station selects its enhanced quality of service at 1120 and proceeds to stage 1108, sending to the mobile device a command to adopt a corresponding power saving mode.

Instead of a command to adopt a selected QOS and power consumption mode, in another embodiment of the invention the command transmitted from the base station to the mobile station is a command to adopt a reduced power consumption mode when selected by the base station, and which is de-asserted otherwise. In yet another embodiment of the invention the command transmitted from the base station to the mobile station is a command to change communication mode from the current mode to a defined alternative mode.

The invention claimed is:

1. A mobile communication device for communicating with a base station and having first and second alternative communication modes, said first communication mode having higher quality of service and higher power consumption than said second communication mode, and said device comprising:
a power supply;
wherein said mobile device is responsive to a characteristic of said power supply indicative of a reduced reserve of energy in said power supply to select said second communication mode and transmit to said base station a state indication identifying existence of a low energy condition of said power supply, said state indication to cause said base station to respond by allocating more resources to reception of signals transmitted by said mobile device operating in said second communication mode than in said first communication mode wherein said mobile communication device is arranged to express in said second communication mode a characteristic selected from a group consisting of:
a different modulation scheme in said second communication mode from said first communication mode for communication with said base station;
a different transport protocol in said second communication mode from said first communication mode for communication with said base station;
more base station receive diversity resources allocated by said base station to reception of said signals transmitted by said mobile communication device in said second communication mode from said first communication mode; and
increased transmit power of base station signals to said mobile communication device in said second communication mode relative to said transmit power of base station signals to said mobile communication device in said first communication mode.

2. A mobile communication device as claimed in claim 1, wherein said state indication transmitted to said base station is arranged to identify a communication mode adopted by said mobile device.

3. A mobile communication device as claimed in claim 1, responsive to a signal from said base station to adopt said second communication mode after transmitting to said base station said indication identifying existence of a low energy condition of said internal power supply.

4. A mobile communication device as claimed in claim 1, wherein said characteristic indicative of a reduced reserve of energy in said power supply is a power supply voltage less than a threshold voltage (Vth).

5. A mobile communication device as claimed in claim 1, wherein said first communication mode of said mobile device includes spatial receive diversity support, which is arranged to be reduced or disabled in said second communication mode of said mobile device.

6. A mobile communication device as claimed in claim 1, wherein said mobile device is arranged to communicate with said base station employing Enhanced Data Rates for GSM Evolution (EDGE) in said first communication mode and communicate employing Gaussian Minimum Shift Keying in said second communication mode.

7. A mobile communication device as claimed in claim 1, wherein said mobile device is arranged to transmit at lower power in said second communication mode than in said first communication mode.

8. The method of claim 1, wherein said characteristic comprises said different modulation scheme in said second communication mode from said first communication mode for communication with said base station.

9. The method of claim 1, wherein said characteristic comprises said different transport protocol in said second communication mode from said first communication mode for communication with said base station.

10. The method of claim 1, wherein said characteristic comprises said more base station receive diversity resources allocated by said base station to reception of said signals transmitted by said mobile communication device in said second communication mode from said first communication mode.

11. The method of claim 1, wherein said characteristic comprises said increased transmit power of base station signals to said mobile communication device in said second communication mode relative to said transmit power of base station signals to said mobile communication device in said first communication mode.

12. A method of communicating between a mobile communication device and a base station, said mobile device having first and second alternative communication modes, said first communication mode having higher quality of service and higher power consumption than said second communication mode, and said mobile device including a power supply, said method comprising:
selecting said second communication mode in response to a characteristic of said mobile device power supply indicative of a reduced reserve of power in said power supply;
transmitting from said mobile device to said base station a state indication identifying existence of a low energy condition of said power supply; and
responding at said base station to said state indication by allocating more resources to reception of signals transmitted by the mobile device operating in said second communication mode than in said first communication mode wherein said responding comprises an operation selected from a group consisting of: employing a different modulation scheme in said second communication mode from said first communication mode for communication with said mobile device; employing a different transport protocol in said second communication mode from said first communication mode for communication with said mobile device; allocating more base station receive diversity resources to reception of said signals transmitted by said mobile communication device in said second communication mode from said first communication mode; and increasing transmit power of base station signals to said mobile communication device in said second communication mode relative to transmit power of said base station signals to said mobile communication device in said first communication mode.

13. A method of communicating as claimed in claim 12, wherein a state indication transmitted from said mobile device to said base station also identifies a communication mode adopted by said mobile device.

14. A method of communicating as claimed in claim 12, wherein said mobile device responds to a signal from said base station to adopt said second communication mode after transmitting to said base station said state indication identifying existence of a low energy condition of said internal power supply.

15. A method of communicating as claimed in claim 12, wherein said characteristic indicative of a reduced reserve of energy in said power supply is a power supply voltage less than a threshold voltage (Vth).

16. A method of communicating as claimed in claim 12, wherein said base station responds to said state indication from said mobile device by modifying a communication characteristic of said base station with said mobile device, whereby to tend to compensate for said mobile device switching between said first and second communication modes.

17. A method of communicating as claimed in claim 16, wherein said base station and said mobile device communicate employing Enhanced Data Rates for GSM Evolution (EDGE) in said first communication mode and communicate employing Gaussian Minimum Shift Keying in said second communication mode.

18. A method of communicating as claimed in claim 16, wherein said base station and said mobile device communicate employing High-Speed Uplink Packet Access—HSUPA—with a smaller number of HSUPA channels in said second communication mode than in said first communication mode.

19. A method of communicating as claimed in claim 12, wherein said first communication mode of said mobile device includes spatial receive diversity support, which is disabled in said second communication mode of said mobile device.

20. A method of communicating as claimed in claim 19, wherein said base station responds to said state indication from said mobile device by increasing transmit power of signals to said mobile device if it is operating in said second communication mode relative to transmit power of signals if said mobile device is operating in said first communication mode, whereby to tend to compensate for said mobile device switching between said first and second communication modes.

21. A base station for communicating with a mobile communication device and including means responsive to said state indication for controlling the responses of the base station as specified in claim 12.

22. The method of claim 12, wherein said operation comprises said employing said different modulation scheme in said second communication mode from said first communication mode for communication with said mobile device.

23. The method of claim 12, wherein said operation comprises said employing said different transport protocol in said second communication mode from said first communication mode for communication with said mobile device.

24. The method of claim 12, wherein said operation comprises said allocating more base station receive diversity resources to reception of said signals transmitted by said mobile communication device in said second communication mode from said first communication mode.

25. The method of claim 12, wherein said operation comprises said increasing transmit power of said base station signals to said mobile communication device in said second communication mode relative to transmit power of said base station signals to said mobile communication device in said first communication mode.

26. A method of communicating between a mobile communication device and a base station, said mobile device having first and second alternative communication modes, said first communication mode having higher quality of service and higher power consumption than said second communication mode, and said mobile device including a power supply, said method comprising:
monitoring at said mobile device sua sponte a characteristic of said power supply indicative of a reduced reserve of power in said power supply;

selecting said second communication mode in response to said characteristic of said mobile device power supply indicative of a reduced reserve of power in said power supply; and transmitting from said mobile device to said base station a state indication identifying existence of a low energy condition of said power supply said base station responding to said state indication with a response selected from a group consisting of: employing a different modulation scheme in said second communication mode from said first communication mode for communication with said mobile device; employing a different transport protocol in said second communication mode from said first communication mode for communication with said mobile device; increasing base station receive diversity support to reception of said signals transmitted by said mobile communication device in said second communication mode from said first communication mode; and increasing transmit power of base station signals to said mobile communication device in said second communication mode relative to transmit power of base station signals to said mobile communication device in said first communication mode.

27. The method of claim 26, wherein said response comprises said employing a different modulation scheme in said second communication mode from said first communication mode for communication with said mobile device.

28. The method of claim 26, wherein said response comprises said employing a different transport protocol in said second communication mode from said first communication mode for communication with said mobile device.

29. The method of claim 26, wherein said response comprises said increasing base station receive diversity support to reception of said signals transmitted by said mobile communication device in said second communication mode from said first communication mode.

30. The method of claim 26, wherein said response comprises said increasing transmit power of base station signals to said mobile communication device in said second communication mode relative to transmit power of base station signals to said mobile communication device in said first communication mode.

* * * * *